United States Patent
Kim et al.

(10) Patent No.: US 12,418,642 B2
(45) Date of Patent: Sep. 16, 2025

(54) OPTICAL SEE-THROUGH DISPLAY APPARATUS

(71) Applicants: LG Display Co., Ltd., Seoul (KR); POSTECH Research and Business Development Foundation, Pohang-Si (KR)

(72) Inventors: Wook-Sung Kim, Pohang-Si (KR); Kwang-Hwan Ji, Paju-si (KR); Hark-Jin Kim, Paju-si (KR); Sun-Geun Park, Pohang-Si (KR); Hyeon-Seok Eo, Pohang-Si (KR)

(73) Assignee: LG Display Co., Ltd., Seoul (KR)

( * ) Notice: Subject to any disclaimer, the term of this patent is extended or adjusted under 35 U.S.C. 154(b) by 127 days.

(21) Appl. No.: 18/531,551

(22) Filed: Dec. 6, 2023

(65) Prior Publication Data
US 2024/0267504 A1 Aug. 8, 2024

(30) Foreign Application Priority Data
Feb. 3, 2023 (KR) .......................... 10-2023-0014854

(51) Int. Cl.
H04N 13/327 (2018.01)
H04N 13/257 (2018.01)

(52) U.S. Cl.
CPC ......... *H04N 13/327* (2018.05); *H04N 13/257* (2018.05)

(58) Field of Classification Search
CPC .. G02B 27/0172; G06F 3/013; H04N 13/257; H04N 13/324; H04N 13/327; H04N 13/344

USPC .......................................................... 348/51
See application file for complete search history.

(56) References Cited

U.S. PATENT DOCUMENTS

| | | | | |
|---|---|---|---|---|
| 8,503,085 B2* | 8/2013 | Kim | ................... | G02B 27/0172 359/630 |
| 2013/0027400 A1* | 1/2013 | Kim | ..................... | H04N 13/341 345/426 |
| 2015/0177517 A1* | 6/2015 | Blonde | .............. | G02B 27/0101 345/7 |
| 2015/0363978 A1* | 12/2015 | Maimone | ........... | G02B 27/0172 345/633 |
| 2017/0068100 A1* | 3/2017 | Ouderkirk | .......... | B29D 11/0073 |

(Continued)

*Primary Examiner* — Christopher S Kelley
*Assistant Examiner* — Ana Picon-Feliciano
(74) *Attorney, Agent, or Firm* — Seed Intellectual Property Law Group LLP

(57) ABSTRACT

An optical see-through display apparatus includes an image output module, a display panel, an optical shutter panel to adjust a transmittance of an external light for each of R, G, and B colors. The display apparatus includes an optical sensor to measure a color of the external light. The display apparatus includes a processor that generates R, G, and B shutter data through a first compensation algorithm. The first compensation algorithm is operated to: compare a color of a mixed virtual image with a color of a target mixed virtual image, and when a color difference therebetween is a threshold value or less, designate a transmittance of the optical shutter panel as a candidate transmittance, and select a candidate transmittance implementing the mixed virtual image most similar to the target mixed virtual image, and generate the R, G, and B shutter data corresponding to the selected candidate transmittance.

20 Claims, 10 Drawing Sheets

(56) References Cited

U.S. PATENT DOCUMENTS

2019/0266976 A1* 8/2019 Wyble .................... G06F 3/147
2021/0165227 A1* 6/2021 Yamaguchi .......... G02B 25/001

* cited by examiner

|   | Reference image | Distortion | Compensation | Error (%) |
|---|---|---|---|---|
| L* | 54.27 | 62.2 | 54.35 | 0.15 |
| a* | 16.21 | 33.1 | 15.98 | 1.42 |
| b* | 30.09 | 41.97 | 30.19 | 0.33 |

FIG. 9A

|   | Reference image | Distortion | Compensation | Error (%) |
|---|---|---|---|---|
| L* | 54.27 | 191.2 | 54.44 | 0.31 |
| a* | 16.21 | 33.83 | 15.3 | 5.61 |
| b* | 30.09 | -55.7 | 30.85 | 2.53 |

FIG. 9B

OPTICAL SEE-THROUGH DISPLAY APPARATUS

CROSS REFERENCE TO RELATED APPLICATIONS

The present application claims the priority benefit of Korean Patent Application No. 10-2023-0014854 filed in Republic of Korea on Feb. 3, 2023, which is hereby incorporated by reference in its entirety for all purposes as if fully set forth herein.

BACKGROUND

Technical Field

The present disclosure relates to an optical see-through display apparatus.

Description of the Related Art

An optical see-through display apparatus is a display apparatus that simultaneously provides a user with a virtual image generated from it and an external real image passing through it, and is generally used as a head mounted display (HMD) apparatus.

Since the optical see-through display apparatus displays a mixture of the virtual image and the real image to the user, it is used as an optical display apparatus based on augmented reality or mixed reality.

BRIEF SUMMARY

As noted, the optical see-through display apparatus in the related art displays a mixture of the virtual image and the real image to the user. The inventors of the present disclosure have recognized that a problem arises in which the virtual image viewed by the user is distorted by the external light. Accordingly, the present disclosure is directed to an optical see-through display apparatus that substantially obviates one or more of the problems due to limitations and disadvantages of the related art including the technical problem identified above.

An advantage of the present disclosure is to provide an optical see-through display apparatus which can improve distortion of a virtual image caused by an external light.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, an optical see-through display apparatus includes: an image output module including an image generation panel that generates a virtual image; a display panel on which the virtual image is projected, the virtual image being output toward a user's eyes from a display region of the display panel; an optical shutter panel disposed on an outer surface of the display panel, and including R, G, and B sub-pixels to adjust a transmittance of an external light for each of R, G, and B colors; an optical sensor that measures a color of the external light; and a processor that generates R, G, and B shutter data through a first compensation algorithm and provides the R, G, and B shutter data to the optical shutter panel, wherein the first compensation algorithm is operated to: compare a color of a mixed virtual image, which is a mixture of an original virtual image and the external light transmitted through the optical shutter panel, with a color of a target mixed virtual image, and when a color difference between the mixed virtual image and the target mixed virtual image is equal to or less than a threshold value, designate a transmittance of the optical shutter panel as a candidate transmittance, and select a candidate transmittance, which implements the mixed virtual image that is most similar to the color of the target mixed virtual image, among designated candidate transmittances, and generate the R, G, and B shutter data corresponding to the selected candidate transmittance.

In another aspect, an optical see-through display apparatus includes: an image output module including an image generation panel that generates a virtual image; a display panel on which the virtual image is projected, the virtual image being output toward a user's eyes from a display region of the display panel; an optical shutter panel disposed on an outer surface of the display panel, and including R, G, and B sub-pixels to adjust a transmittance of an external light for each of R, G, and B colors; an optical sensor that measures a color of the external light; and a processor that generates R, G, and B image data through a second compensation algorithm and provides the R, G, and B image data to the image generation panel, wherein the second compensation algorithm is operated to: mix at least one candidate virtual image and the external light to generate at least one mixed candidate virtual image, and compare a color of the at least one mixed candidate virtual image with a color of a target mixed virtual image to select the mixed candidate virtual image that is most similar to the target mixed virtual image, and generate the R, G, B image data corresponding to the candidate virtual image forming the selected mixed candidate virtual image.

In yet another aspect, an optical see-through display apparatus includes: an image output module including an image generation panel that generates a virtual image; a display panel on which the virtual image is projected, the virtual image being output toward a user's eyes from a display region of the display panel; an optical shutter panel disposed on an outer surface of the display panel, and including R, G, and B sub-pixels to adjust a transmittance of an external light for each of R, G, and B colors; an optical sensor that measures a color of the external light; and a processor that generates R, G, and B shutter data and R, G, and B image data through a third compensation algorithm, provides the R, G, and B shutter data to the optical shutter panel, and provides the R, G, and B image data to the image generation panel, wherein the third compensation algorithm is operated to: when it is determined that a correction of the virtual image is possible, designate a transmittance of the optical shutter panel, which implements a candidate transmitted external light transmitted through the optical shutter panel, as a candidate transmittance, mix the candidate transmitted external light and at least one candidate virtual image corresponding thereto to generate at least one mixed candidate virtual image, compare a color of the at least one mixed candidate virtual image with a color of a target mixed virtual image to select the mixed candidate virtual image that is most similar to the target mixed virtual image, select a candidate transmittance that is highest among designated candidate transmittances, generate the R, G, B image data corresponding to the candidate virtual image of the selected mixed candidate virtual image implemented by the selected candidate transmittance, and generate the R, G, B shutter data corresponding to the selected candidate transmittance.

It is to be understood that both the foregoing general description and the following detailed description are exemplary and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings:

FIGS. 9A and 9B are views illustrating a result of an experiment on implementation of a virtual image through an optical see-through display apparatus according to a second embodiment of the present disclosure;

DETAILED DESCRIPTION

Figure 1:
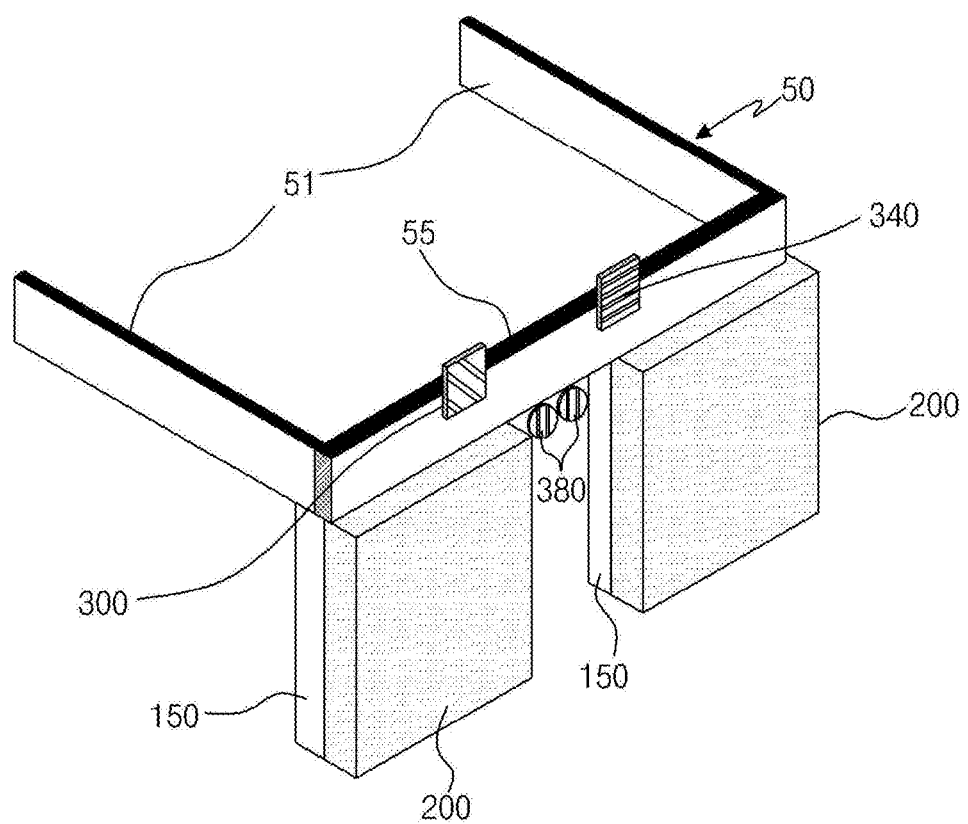
FIG. 1 is a view schematically illustrating a structure of an optical see-through display apparatus according to a first embodiment of the present disclosure.

Advantages and features of the present disclosure and methods of achieving them will be apparent with reference to the embodiments described below in detail with the accompanying drawings. However, the present disclosure is not limited to the embodiments disclosed below, but can be realized in a variety of different forms, and only these embodiments allow the present disclosure to be complete. The present disclosure is provided to fully inform the scope of the disclosure to the skilled in the art of the present disclosure, and the present disclosure can be defined by the scope of the claims.

The shapes, sizes, proportions, angles, numbers, and the like disclosed in the drawings for explaining the embodiments of the present disclosure are illustrative, and the present disclosure is not limited to the illustrated matters. The same reference numerals refer to the same components throughout the description.

Furthermore, in describing the present disclosure, if it is determined that a detailed description of the related known technology unnecessarily obscure the subject matter of the present disclosure, the detailed description thereof can be omitted. When 'comprising,' 'including,' 'having,' 'consisting,' and the like are used in this disclosure, other parts can be added unless 'only' is used. When a component is expressed in the singular, cases including the plural are included unless specific statement is described.

In interpreting the components, even if there is no separate explicit description, it is interpreted as including a margin range.

In the case of a description of a positional relationship, for example, when the positional relationship of two parts is described as 'on,' 'over,' 'above,' 'below,' 'beside,' 'under,' and the like, one or more other parts can be positioned between such two parts unless 'right' or 'directly' is used.

In the case of a description of a temporal relationship, for example, when a temporal precedence is described as 'after,' 'following,' 'before,' and the like, cases that are not continuous can be included unless 'directly' or 'immediately' is used.

In describing components of the present disclosure, terms such as first, second and the like can be used. These terms are only for distinguishing the components from other components, and an essence, order, order, or number of the components is not limited by the terms. Further, when it is described that a component is "connected," "coupled" or "contact" to another component, the component can be directly connected or contact the another component, but it should be understood that other component can be "interposed" between the components.

The term "module" as used herein may include any electrical circuitry, features, components, an assembly of electronic components or the like. That is, "module" may include any processor-based or microprocessor-based system including systems using microcontrollers, integrated circuit, chip, microchip, reduced instruction set computers (RISC), application specific integrated circuits (ASICs), field-programmable gate arrays (FPGAs), graphical processing units (GPUs), logic circuits, and any other circuit or processor capable of executing the various operations and functions described herein. The above examples are examples only, and are thus not intended to limit in any way the definition or meaning of the term "module."

In some embodiments, the various modules described herein may be included in or otherwise implemented by processing circuitry such as a microprocessor, microcontroller, or the like.

Respective features of various embodiments of the present disclosure can be partially or wholly connected to or combined with each other and can be technically interlocked and driven variously, and respective embodiments can be independently implemented from each other or can be implemented together with a related relationship.

Hereinafter, embodiments of the present disclosure are described in detail with reference to the drawings. Meanwhile, in the following embodiments, the same and like reference numerals are assigned to the same and like components, and detailed descriptions thereof may be omitted.

First Embodiment

Figure 2:
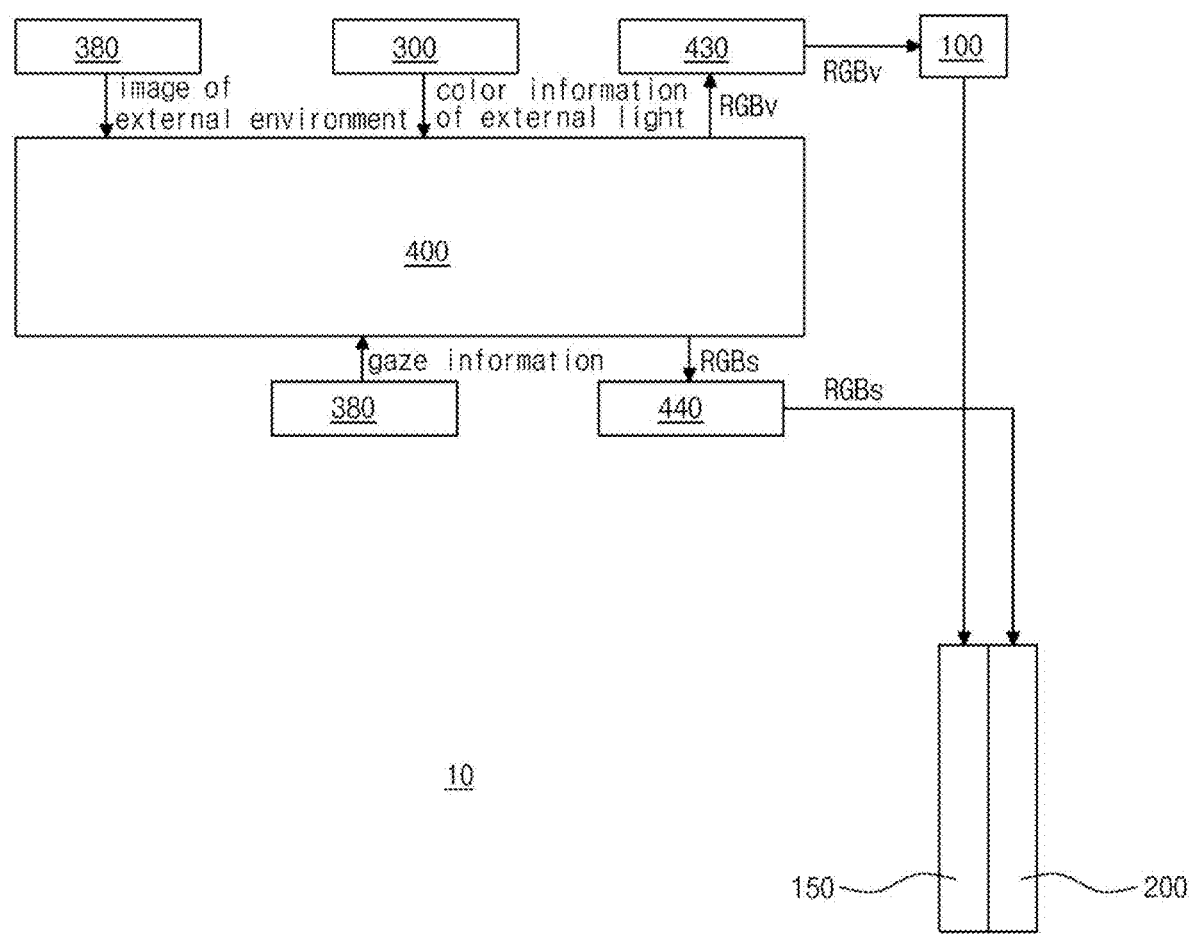
FIG. 2 is a view schematically illustrating a configuration of an optical see-through display apparatus according to a first embodiment of the present disclosure.
Figure 3:
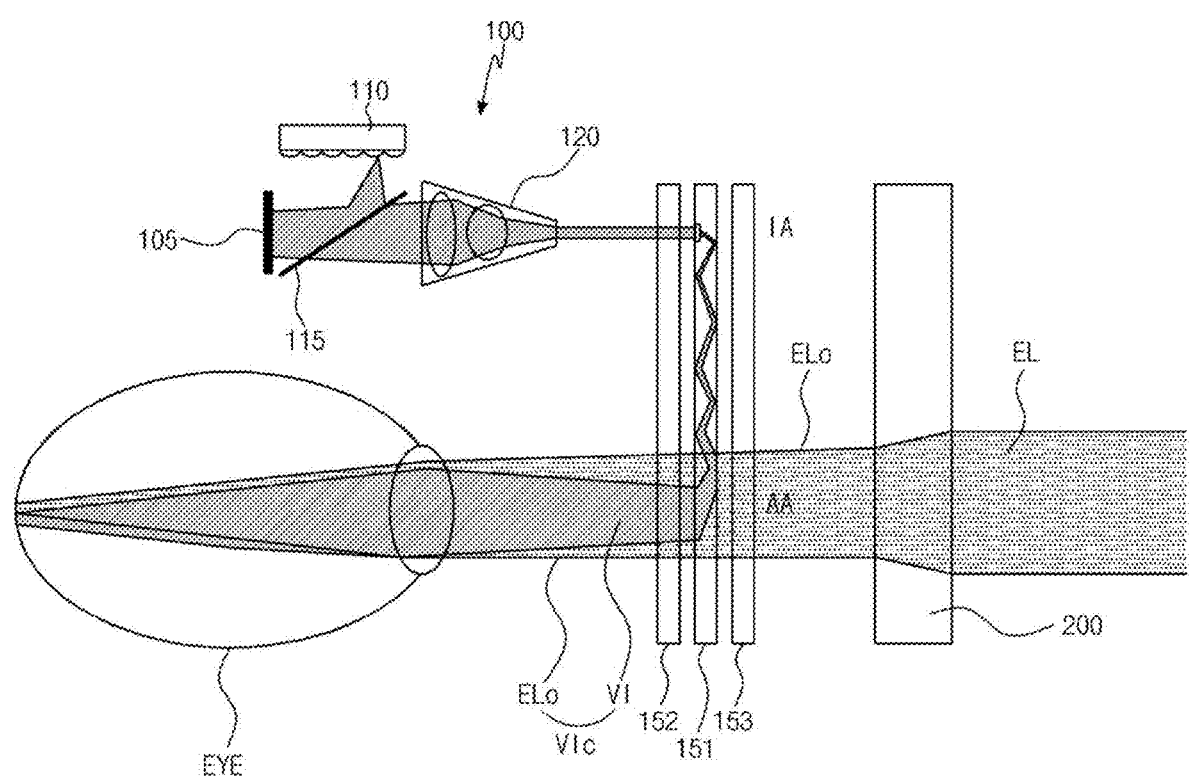
FIG. 3 is a view schematically illustrating how a virtual image mixed with an external light is provided to a user through a display panel and an optical shutter panel according to a first embodiment of the present disclosure.

FIG. 1 is a view schematically illustrating a structure of an optical see-through display apparatus according to a first embodiment of the present disclosure, and FIG. 2 is a view schematically illustrating a configuration of an optical see-through display apparatus according to a first embodiment of the present disclosure. FIG. 3 is a view schematically illustrating how a virtual image mixed with an external light is provided to a user through a display panel and an optical shutter panel according to a first embodiment of the present disclosure.

Referring to FIGS. 1 to 3, the optical see-through display apparatus 10 of this embodiment may be an HMD apparatus that is worn on a user's head and provides the user with a virtual image VIc combined with an external real image.

The optical see-through display apparatus 10 mayinclude, for example, an instrument frame (or housing) 50; an image output module (or optical output module) 100, a display panel 150, an optical shutter panel (or secondary display panel) 200 and an optical sensor 300 which are optical elements mounted (or installed) on the instrument frame 50; and a driving circuit portion that drives the image output module 100 and the optical shutter panel 200. Moreover, the optical see-through display apparatus 10 mayinclude a camera 340 and an eye tracker 380.

Here, the driving circuit portion may include, for example, a processor 400, an output module driving circuit 430, and a shutter panel driving circuit 440.

The instrument frame 50 may define an outward shape of the optical see-through display apparatus 10 and may include a first frame 51 and a second frame 55.

For example, the first frame 51 may be a part that directly contacts the user's head and allows the optical see-through display apparatus 10 to be mounted on the user. For example, the image output module 100 and the driving circuit portion may be built into the first frame 51.

The second frame 55 may be a part which is connected to the front end of the first frame 51, and on which the display panel 150 arranged to correspond to one or each of the user's eyes EYE, for example, the left eye and the right eye, is mounted. The second frame 55 may be formed integrally with the first frame 51, or may be formed separately from the first frame 51 and coupled to the first frame 51.

The image output module 100 and the display panel 150 may be components that generate and output a virtual image VI and provide it to the user.

The image output module 100 may generate the virtual image VI and provide it to the display panel 150.

In this regard, for example, referring to FIG. 3, the image output module 100 may include an image generation panel 105. The image generation panel 105 may be, for example, a liquid crystal panel, and in this case, the image output module 100 may further include a light source 110 for providing light for image generation to the image generation panel 105, and a reflective polarizer 115.

Meanwhile, the image generation panel 105 may use an image generation panel different from a liquid crystal panel, for example, a light emitting diode panel, etc. When the light emitting diode panel using a self-luminous element is used, the light source 110 and the reflective polarizer 115 may be omitted.

In this embodiment, for convenience of explanation, the case where the liquid crystal panel is used as the image generation panel 105 is taken as an example.

Figure 4:
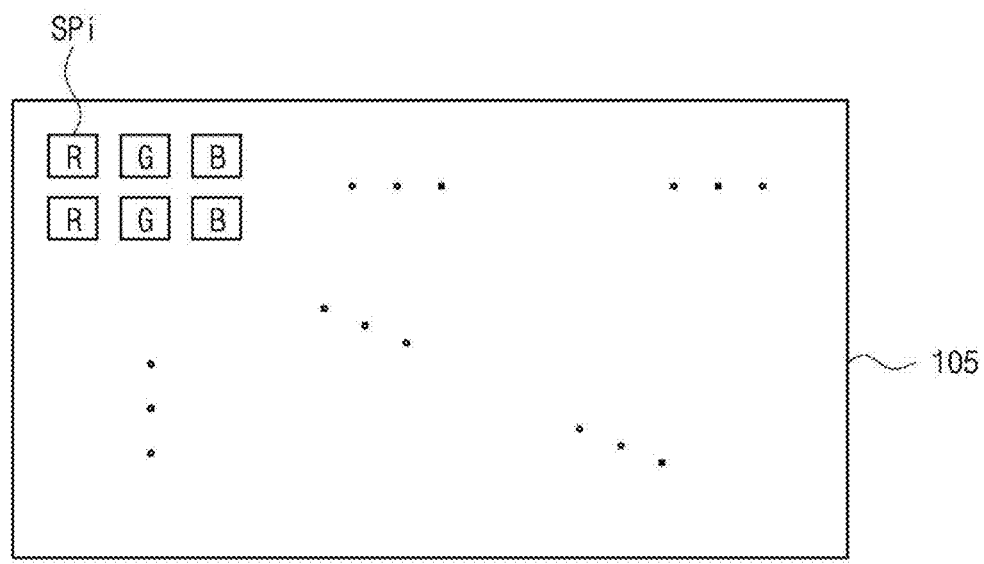
FIG. 4 is a view schematically illustrating a pixel arrangement of an image generation panel according to a first embodiment of the present disclosure.

For example, as shown in FIG. 4, the image generation panel 105 may include a plurality of red (R), green (G), and blue (B) subpixels (or R, G, and B first subpixels) SPi. Here, the red, green, and blue sub-pixels SPi that are adjacent to each other can form one pixel which is a unit expressing full color.

The image generation panel 105 may be, for example, supplied with R, G, and B image data RGBv corresponding to the R, G, and B subpixels SPi, which are analog image data (or data voltages) RGBv provided from the output module driving circuit 430, and in response, may change arrangements of liquid crystal molecules for each of the R, G, and B sub-pixels SPi, and may modulate light provided from the light source 110 for each of the R, G, and B sub-pixels SPi, and thus may generate and output the virtual image VI.

Here, the light source 110 may output light toward, for example, the reflective polarizer 115, and the reflective polarizer 115 may reflect the light from the light source 110 to the image generation panel 105. The light provided by being reflected may be modulated for each of the R, G, and B sub-pixels SPi in the image generation panel 105 and output as the virtual image VI (or light of the virtual image).

The virtual image VI output in this way may pass through the reflective polarizer 115, then through a projection lens system 120, and then be input to the display panel 150.

As such, the image generation panel 105 may generate the virtual image VI and project it onto the display panel 150.

For example, the display panel 150 may include at least one wave guide plate (or light guide plate) 151, and first and second protective members which are protective members 152 and 153 disposed on both surfaces (or inner and outer surfaces) of the wave guide plate 151. In this embodiment, for convenience of explanation, the case where one waveguide plate 151 is provided is shown as an example.

The display panel 150 may include a display region AA and an incident region (or projection region or incident light region) IA. Here, the incident region IA is a region where the virtual image VI is incident on the display panel 150 and may be a non-display region where the virtual image VI does not be output.

The virtual image VI incident on the incident region IA may be guided in a horizontal direction along the waveguide plate 151 toward the display region AA, and may be output from the display region AA toward the user's eyes EYE. In this way, the display region AA may be a region where the virtual image VI is output and displayed.

The optical shutter panel 200 may be disposed on an outer surface of the display panel 150 opposite to an inner surface of the display panel 150 that is a light output surface of the virtual image VI. The optical shutter panel 200 may be attached to the outer surface of the display panel 150.

The optical shutter panel 200 may perform an optical shutter (or light attenuation) operation to adjust (or control) transmittance (or attenuation rate) of the external light EL passing through it.

Figure 5:
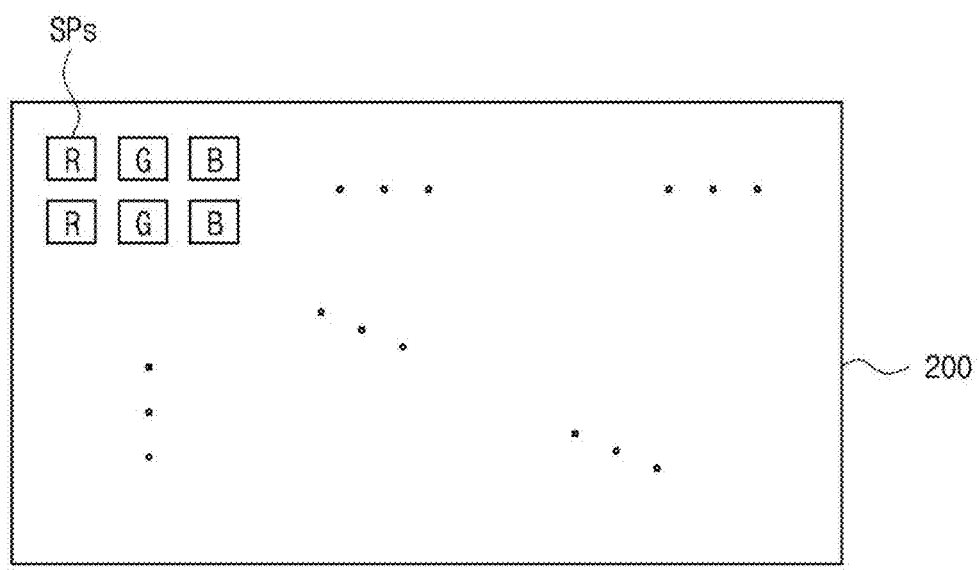
FIG. 5 is a view schematically illustrating a pixel arrangement of an optical shutter panel according to a first embodiment of the present disclosure.

For example, as shown in FIG. 5, the optical shutter panel 200 may include a plurality of R, G, and B subpixels (or R, G, and B second subpixels) SPs. Accordingly, the optical shutter panel 200 may adjust the transmittance of the external light EL for each of red, green, and blue. By adjusting the transmittance of the optical shutter panel 200 for each color, the optical see-through display apparatus 10 may have a dimming effect for each color.

The optical shutter panel 200 may be formed of, for example, a liquid crystal panel or an electrophoresis panel, but not limited thereto, and any type of display panel that can adjust the light transmittance individually for red, green and blue may be used.

When the optical shutter panel 200 is formed of a liquid crystal panel, each of the R, G, and B subpixels SPs may be provided with R, G, and B color filter patterns which are color conversion means.

The optical shutter panel 200 may be, for example, supplied with R, G, and B shutter data RGBs corresponding to the R, G, and B subpixels SPs, which are analog image data (or data voltages) RGBs provided from the shutter panel driving circuit 440, and in response, may adjust the transmittance of each of red light, green light, and blue light for each of the R, G, and B subpixel SPs.

An intensity of the external light ELo transmitted through the optical shutter panel 200 may be adjusted for each color and provided to the display panel 150.

As such, since the external light ELo whose color is adjusted can be provided to the display panel 150 through the optical shutter panel 200, the virtual image VIc mixed with the external light ELo can have a color similar to (or close to) an original virtual image to be displayed. Accordingly, it is possible to effectively compensate for color distortion of the mixed virtual image VIc due to the external light EL being directly mixed with the virtual image VI.

Meanwhile, the output module driving circuit 430 may receive the digital image data RGBv provided from the processor 400, convert the data RGBv into analog data, and provide the analog data to the image output module 100.

In addition, the shutter panel driving circuit 440 may receive the digital shutter data RGBs provided from the processor 400, convert the data RGBs into analog data, and provide the analog data to the optical shutter panel 200.

The optical sensor 300 may measure, for example, the external light EL for each of red, green, and blue. More specifically, the intensity of the external light EL for each of red, green, and blue may be measured. Accordingly, the optical sensor 300 may measure R, G, and B color data of the external light EL which are color information of the external light EL that affects the virtual image VI of the optical see-through display apparatus 10. The optical sensor 300 may include, for example, a photodiode as an optical measurement element.

The color information of the external light EL measured in this way may be provided to the processor 400.

The camera 340 may capture an external environment in front of the optical see-through display apparatus 10 and generate an image of the external environment. The external environment image may be provided to the processor 400.

The eye tracker 380 may detect, for example, a user's gaze by tracking the user's pupils. The user's gaze information measured in this way may be provided to the processor 400.

In this embodiment, for example, the processor 400 may conduct an operation to adjust the external light EL, more specifically, an operation (or algorithm) to attenuate the external light EL in order to perform a virtual image compensation by reducing the influence of the external light EL on the virtual image VI. Moreover, the processor 400 may perform an operation to correct the virtual image VI separately or together with the operation to adjust the external light EL, and through this virtual image correction operation, the processor 400 may compensate for distortion of the virtual image VI combined with the external light EL.

Hereinafter, the external light adjustment operation and the virtual image correction operation in the processor 400 is described in more detail.

Figure 6:
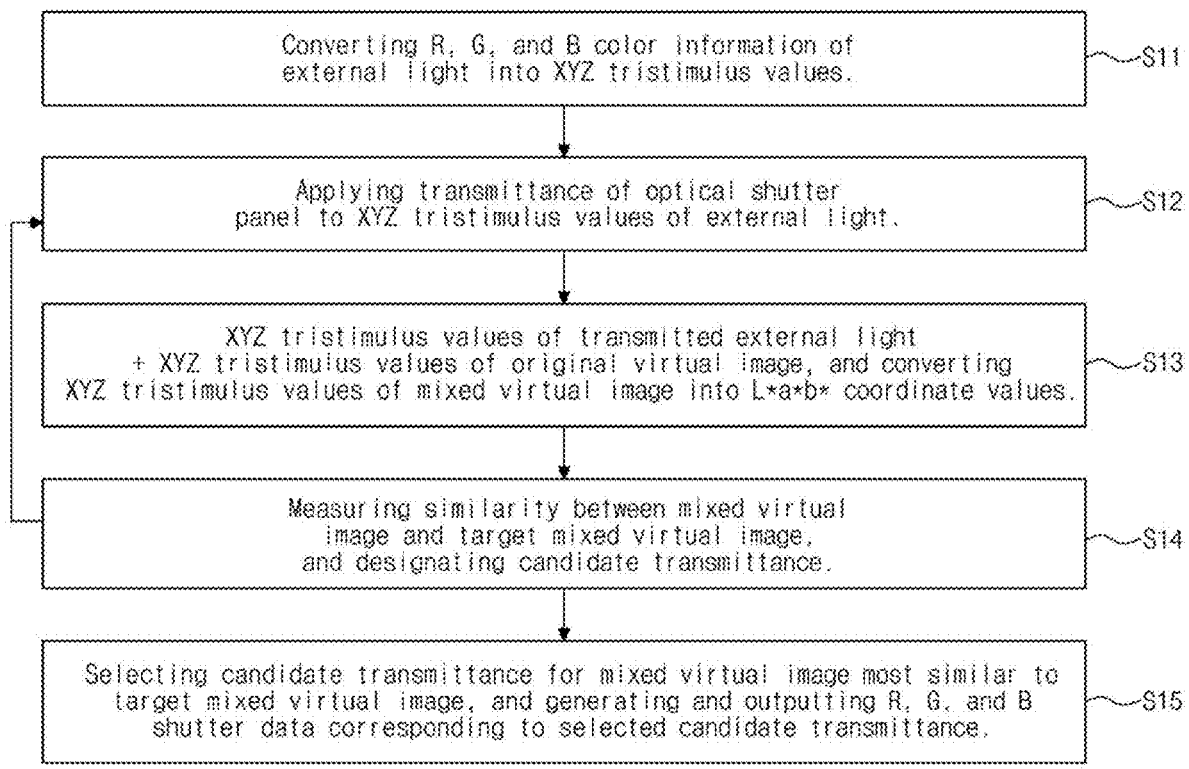
FIG. 6 is a flowchart illustrating an external light adjustment algorithm performed by a processor according to a first embodiment of the present disclosure.

FIG. 6 is a flowchart illustrating an external light adjustment algorithm performed by a processor according to a first embodiment of the present disclosure.

Referring to FIG. 6 along with FIGS. 1 to 5, in a step S11 of the external light adjustment (or external light attenuation) algorithm (or first compensation algorithm) ALG1, the processor 400 may be provided with the R, G, and B color data which are the color information of the external light measured by the optical sensor 300.

The R, G, and B color data input in this way may be, for example, converted into XYZ tristimulus values which are digital data suitable for computational processing within the processor 400. The XYZ tristimulus values correspond to the tristimulus values in a CIE XYZ color space.

Next, in a step S12, the processor 400 may apply a transmittance of the optical shutter panel 200 to the XYZ tristimulus values of the external light to calculate the XYZ tristimulus values of the external light transmitted through the optical shutter panel 200.

Here, regarding the transmittance of the optical shutter panel 200, for example, a state that can transmit R, G, and B colors to the maximum can be set as a default state. In this regard, for example, when the optical shutter panel 200 is driven with 8-bit R, G, B shutter data RGBs, the optical shutter panel 200 may adjust the transmittance for each of R, G, and B colors within a range of $0^{th}$ to $255^{th}$ levels (i.e., 256 levels), and an initial default state in the step S12 may be configured such that the R, G, and B color transmittances are each set to the maximum level, the $255^{th}$ level (i.e., each of the R, G, and B shutter data RGBs is set to 255).

In this case, in the step S12, the XYZ tristimulus values of the external light transmitted through the optical shutter panel 200 in the maximum transmittance state for each of the R, G, and B colors may be calculated.

Next, in a step S13, the processor 400 may add XYZ tristimulus values of the original virtual image, which is a color information of the original virtual image, to the XYZ tristimulus values of the transmitted external light calculated in step S12. Accordingly, XYZ tristimulus values as a color information of a virtual image that is a mixture of transmitted external light and the original virtual image can be calculated.

Moreover, in the step S13, the XYZ tristimulus values of the mixed virtual image may be converted into L*a*b* coordinate values of a CIE L*a*b* color coordinate system.

Next, in a step S14, the processor 400 may compare the L*a*b* coordinate values of the mixed virtual image calculated in step S13 with L*a*b* coordinate values of a target mixed virtual image to measure a similarity therebetween.

Here, the target mixed virtual image may be a mixed virtual image that can be substantially recognized as the original virtual image by the user's eyes EYE. The target mixed virtual image may be, for example, automatically generated based on the original virtual image once the original virtual image is determined (or selected or set).

The similarity may be, for example, measured as a distance difference between the L*a*b* coordinate values of the mixed virtual image calculated in the step S13 and the L*a*b* coordinate values of the target mixed virtual image, that is, the distance difference in the L*a*b* color space. For example, when the distance difference between the L*a*b* coordinate values is 5 or less, and more preferably 2 or less, the mixed virtual image may be judged (or determined) to be similar to the target mixed virtual image.

In this way, when the similarity measured by the distance difference between the L*a*b* coordinate values is equal to or less than a threshold value (for example, the distance difference is 5 or less), the mixed virtual image may be judged to be similar to the target mixed virtual image.

As such, when it is judged in the step S14 that the mixed virtual image is similar to the target mixed virtual image, the transmittance of the optical shutter panel 200 implementing the mixed virtual image may be designated as a candidate transmittance.

When the similarity judgment and the candidate transmittance designation are performed in the step S14, a process returns to the step S12 and the above-described steps S12 to S14 may be repeated. In this regard, the transmittance of the optical shutter panel 200 may be changed step by step for each of R, G, and B colors, and the steps S12 to S14 may be repeatedly performed each time the change is made.

In this regard, for example, as above, a first round of steps S12 to S14 may be performed with the R, G, and B color transmittances of the optical shutter panel 200 set to $255^{th}$ level, $255^{th}$ level, and $255^{th}$ level, and then a second round of steps S12 to S14 may be performed in a state of one of the R, G, and B color transmittances of the optical shutter panel 200 being lowered by one level (for example, with the R, G, and B color transmittances being changed to $254^{th}$ level, $255^{th}$ level, and $255^{th}$ level). Thereafter, a third round of steps S12 to S14 may be performed in a state of another one of the R, G, and B color transmittances of the optical shutter panel 200 being lowered by one level (for example, with the R, G, and B color transmittances being changed to $254^{th}$ level, $254^{th}$ level, and $255^{th}$ level). Thereafter, a fourth round of steps S12 to S14 may be performed in a state of yet another one of the R, G, and B color transmittances of the optical shutter panel 200 being lowered by one level (for example, with the R, G, and B color transmittances being changed to $254^{th}$ level, $254^{th}$ level, and $254^{th}$ level).

In this way, the steps S12 to S14 may be repeatedly performed while changing the transmittance of the optical shutter panel 200 step by step for each of the R, G, and B colors, and the change in transmittance may be performed until the R, G and B color transmittances reaches $0^{th}$ level, $0^{th}$ level, and $0^{th}$ level that are the lowest levels.

When the stepwise changes in transmittance for each of the R, G, and B colors of the optical shutter panel 200 are completed, the candidate transmittance(s) of the optical shutter panel 200 that implement the mixed virtual images similar to the target mixed virtual image may be finally designated and obtained.

For the candidate transmittances obtained in this way, in a step S15, the processor 400 may select the candidate transmittance that implements the mixed virtual image that is most similar to (or closest to) the target mixed virtual image.

Thereafter, in the step ST15, the processor 400 may generate and output the R, G, and B shutter data RGBs corresponding to the selected candidate transmittance. In this case, the processor 400 may generate and output the R, G, and B image data RGBv corresponding to the original virtual image.

Accordingly, the optical shutter panel 200 may adjust (or attenuate) the external light according to the selected transmittance, and the adjusted external light may be mixed with the virtual image output from the display panel 150 to provide the mixed virtual image to the user's eyes EYE.

Accordingly, the user can perceive the mixed virtual image similar to the original virtual image, and the distortion of the virtual image due to the external light can be compensated and improved.

Figure 7:
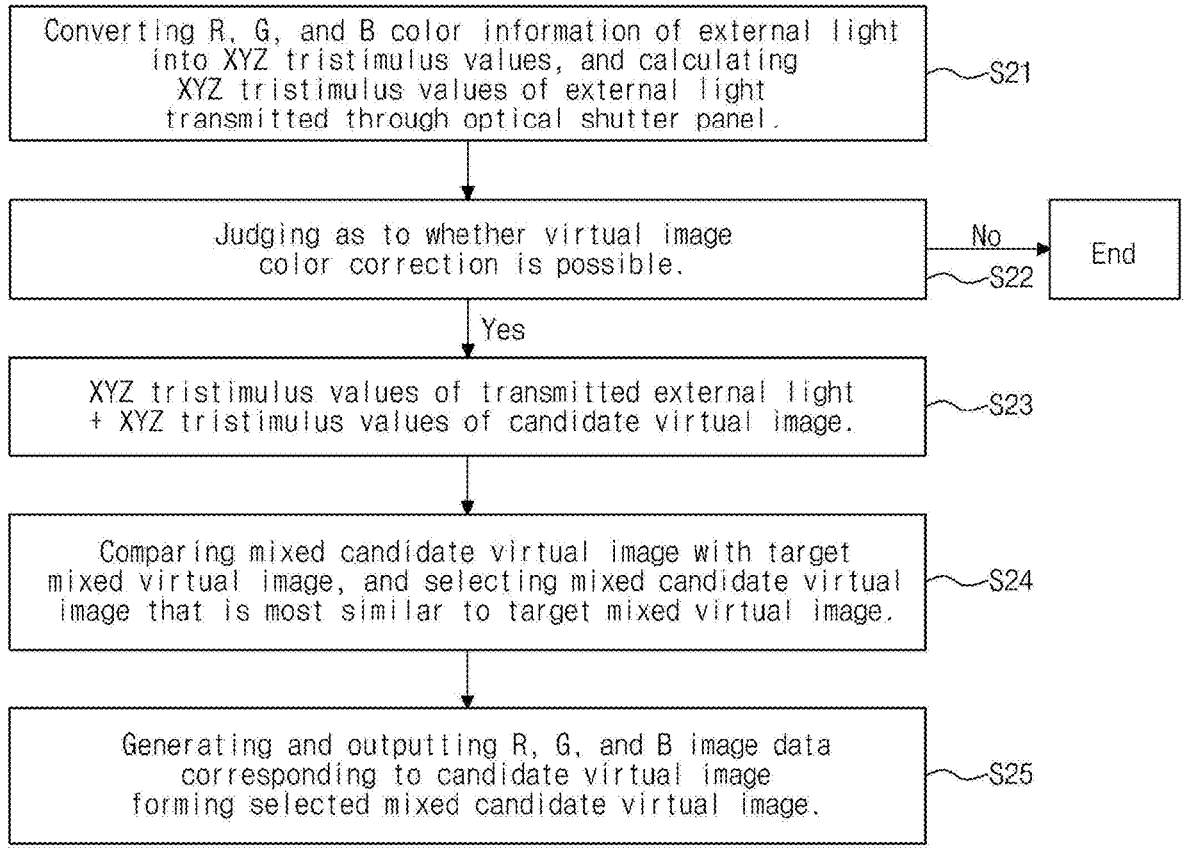
FIG. 7 is a flowchart illustrating a virtual image correction algorithm performed by a processor according to a first embodiment of the present disclosure.

FIG. 7 is a flowchart illustrating a virtual image correction algorithm performed by a processor according to a first embodiment of the present disclosure.

Referring to FIG. 7 along with FIGS. 1 to 5, in a step S21 of the virtual image correction algorithm (or second compensation algorithm) ALG2, the processor 400 may receive the R, G, and B color data of the external light measured by the optical sensor 300.

The R, G, and B color data may be, for example, converted into the XYZ tristimulus values which are digital data suitable for computational processing within the processor 400.

Thereafter, in the step S21, similar to the step S12 of the external light control algorithm ALG1 of FIG. 6 described above, the XYZ tristimulus values of the external light transmitted through the optical shutter panel 200 may be calculated.

Here, when the virtual image correction algorithm ALG2 is used independently (or separately) from the external light adjustment algorithm ALG1 of FIG. 6, for example, the XYZ tristimulus values of the external light transmitted through the optical shutter panel 200 having the transmittance in a default state may be used in the step S21.

Meanwhile, when the virtual image correction algorithm ALG2 is used in conjunction with the external light control algorithm ALG1 of FIG. 6, for example, the XYZ tristimulus values of the external light transmitted through the optical shutter panel 200 having the transmittance finally selected in the external light adjustment algorithm ALG1 of FIG. 6 may be used in the step S21.

Next, in a step S22, the processor 400 may for example, perform a preliminary judgement as to whether a virtual image color correction (or compensation) is possible based on the color information of the external light. In this regard, there is a limit to a correction of the virtual image depending on image display characteristics (or display limit) of the optical see-through display apparatus 10, and the correction of the virtual image may not be performed in certain external environments. For example, in cases where the external light is extremely bright or dark, or a light intensity of a specific wavelength is too high or low, there is a limit to a virtual image compensation, and a compensation effect may not be substantially visible to the user.

Accordingly, prior to performing the virtual image correction, a process of judging whether the virtual image correction is appropriate based on the current external light may be performed.

Meanwhile, as the external light color information that is a basis for the preliminary judgment in the step S22, the color information of the external light measured by the optical sensor 300 may be used.

If it is determined that the virtual image color correction is possible as a result of the above preliminary judgment, a step S23 may proceed. Meanwhile, if it is determined that the virtual image color correction is impossible, the virtual image correction algorithm ALG2 may be stopped and ended. In this case, the original virtual image may be provided to the image generation module 100 without correction of the original virtual image.

In the step S23, the processor 400 may generate at least one candidate virtual image by correcting the original virtual image and add the external light of the step S21 to the at least one candidate virtual image. For example, the XYZ tristimulus values of the transmitted external light may be added to the XYZ tristimulus values of each candidate virtual image.

Here, the candidate virtual image may be a virtual image with a color similar to the original virtual image, for example, a virtual image located within a similarity threshold value (e.g., a distance difference of 5 or less) in the L*a*b* color space. Meanwhile, when a plurality of candidate virtual images are used, they may be located at different points in the L*a*b* color space.

Meanwhile, in the step S23, the XYZ tristimulus values of at least one mixed candidate virtual image generated by summation may be converted into L*a*b* coordinate values.

Next, in a step S24, the processor 400 may compare each of the at least one mixed candidate virtual image generated in the step S23 with the target mixed virtual image. In such the comparison, for example, the L*a*b* coordinate values of the mixed candidate virtual image may be compared with the L*a*b* coordinate values of the target mixed virtual image.

As a result of the comparison, the mixed candidate virtual image that is most similar to the target mixed virtual image may be extracted and selected.

Next, in a step S25, the processor 400 may generate and output the R, G, and B image data RGBv corresponding to the candidate virtual image that forms the selected mixed candidate virtual image. In this case, the processor 400 may for example, generate and output the R, G, and B shutter data RGBs that implements the external light used in the step S21 and/or the step S23.

Accordingly, the image generation module 100 may generate the corrected virtual image, which is the selected virtual image, and project it on the display panel 150, and the external light passing through the optical shutter panel 200 may be mixed with the virtual image output from the display panel 150, and the mixed virtual image may be provided to the user's eyes EYE.

Therefore, the user can perceive the mixed virtual image similar to the original virtual image, and the distortion of the virtual image due to the external light can be compensated and improved.

Second Embodiment

Figure 8:
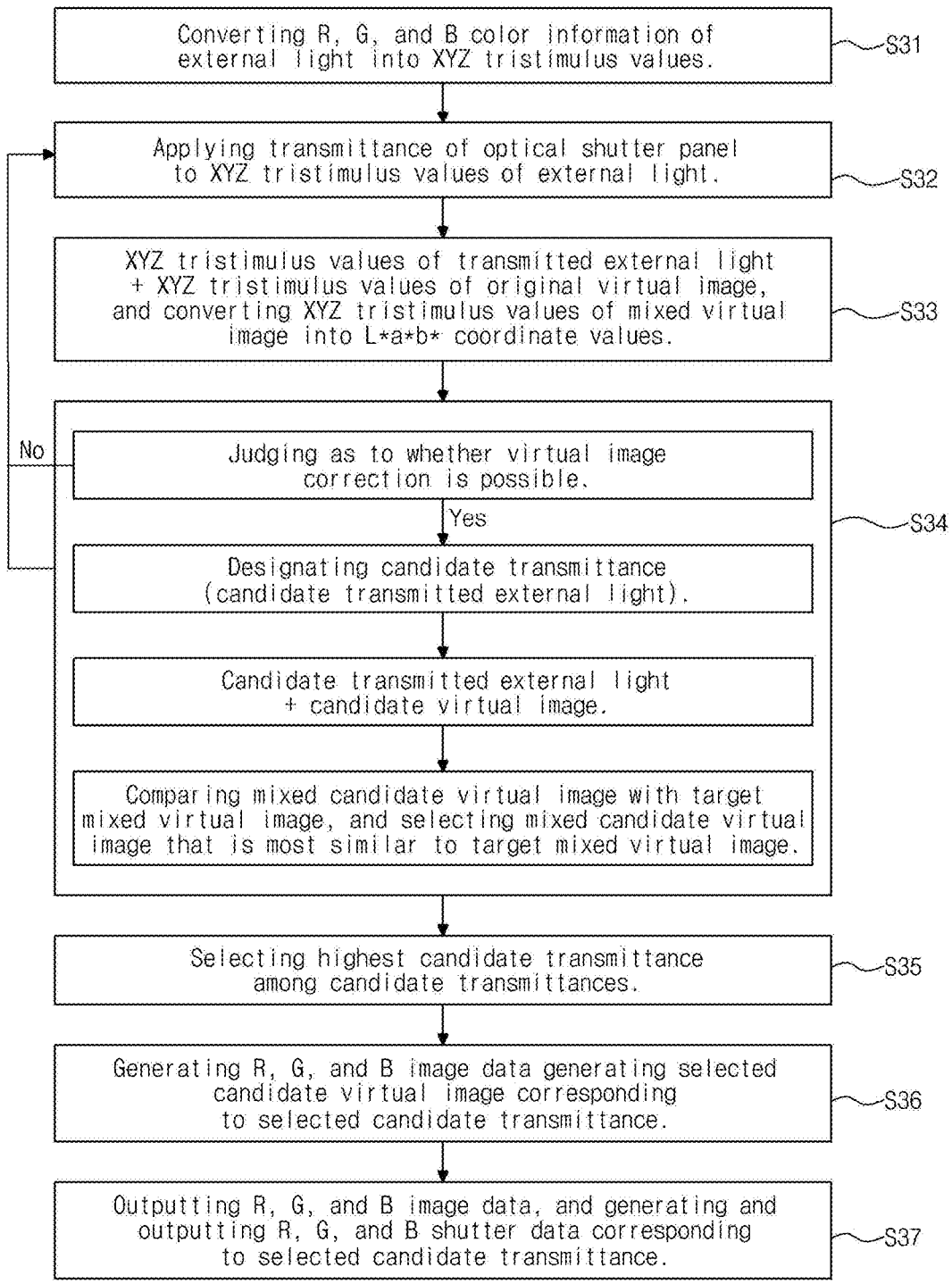
FIG. 8 is a flowchart illustrating an integrated algorithm for external light adjustment and virtual image correction performed by a processor of an optical see-through display apparatus according to a second embodiment of the present disclosure.

FIG. 8 is a flowchart illustrating an integrated algorithm for external light adjustment and virtual image correction performed by a processor of an optical see-through display apparatus according to a second embodiment of the present disclosure.

In the following description, detailed explanations may be omitted for configurations similar to those of the above-described first embodiment, and FIGS. 1 to 5 of the first embodiment may also be referred to.

The processor 400 of the optical see-through display apparatus 10 of this embodiment may execute an integrated algorithm ALG3 of external light adjustment and virtual image correction (or third compensation algorithm) that integrates the external light adjustment algorithm (ALG1 of FIG. 6) and the virtual image correction algorithm (ALG2 of FIG. 7) of the first embodiment. This is described in detail below.

Referring to FIG. 8, steps S31 to S33 of the integrated algorithm ALG3 of external light control and virtual image correction may be performed similarly to the steps S11 and S13 of the external light adjustment algorithm of FIG. 6 of the first embodiment.

In this regard, for example, in a step S31, the processor 400 may receive the R, G, and B color data of the external light measured by the optical sensor 300. The R, G, and B color data input in this way may be converted into the XYZ tristimulus values.

Next, in a step S32, the processor 400 may apply the transmittance of the optical shutter panel 200 to the XYZ tristimulus values of the external light to calculate the XYZ tristimulus values of the external light transmitted through the optical shutter panel 200. At this time, in a first round of the step S32, an operation of applying the transmittance of the optical shutter panel 200 in the default state (e.g., the maximum transmittance) may be performed.

Next, in a step S33, the processor 400 may add the XYZ tristimulus values, which are a color information of the transmitted external light, to the XYZ tristimulus values which is a color information of the original virtual image, and then may convert the XYZ tristimulus values of the mixed virtual image into L*a*b* coordinate values.

Next, a step S34 may be performed similarly to the step S14 of the external light adjustment algorithm ALG1 of FIG. 6 and/or the step S22 of the virtual image correction algorithm ALG2 of FIG. 7 of the first embodiment.

In this regard, for example, in the step S34, the processor 400 may perform a preliminary judgement as to whether the virtual image correction is possible based on the L*a*b* which is the color information of the mixed virtual image in step S33. In this regard, similar to the step S14 of the external light control algorithm ALG1 of FIG. 6, the L*a*b* coordinate values of the mixed virtual image may be compared with the L*a*b* coordinate values of the target mixed virtual image, and when the difference therebetween is equal to or less than a threshold value (for example, 5), it may be judged that the correction is possible.

According to the preliminary judgement, if it is determined that the virtual image correction is possible based on the mixed virtual image in the step S33, the transmittance of the optical shutter panel 200 that implements the transmitted external light of such the mixed virtual image may be designated as a candidate transmittance. Moreover, the transmitted external light implemented by the candidate transmittance may be designated as a candidate transmitted light. Meanwhile, if it is determined that the virtual image correction is impossible, the transmittance at this time may be excluded from a candidate.

Next, after performing the preliminary judgement in the step S34, similar to the external light adjustment algorithm ALG1 of the first embodiment, a process returns to the step S32 and the above-described steps S32 to S34 may be repeated. In this regard, the steps S32 to S34 may be repeatedly performed while changing the transmittance of the optical shutter panel 200 step by step for each of the R, G, and B colors.

When the stepwise changes in transmittance for each of the R, G, and B colors of the optical shutter panel 200 are completed, candidate transmittances capable of the virtual image correction may be finally designated and obtained. Moreover, the candidate transmitted external lights implemented by the candidate transmittances may be finally designated and obtained.

Meanwhile, in the step S34, similar to the steps S23 and S24 of the virtual image correction algorithm ALG2 of the first embodiment, the mixed candidate virtual image that corresponds to the candidate transmitted external light and is most similar to the target mixed virtual image may be extracted and selected.

For example, for each candidate transmitted external light, at least one candidate virtual image may be generated by correcting the original virtual image, and the at least one candidate virtual image may be added to the corresponding candidate transmitted external light to generate at least one mixed candidate virtual image, and each of at least one mixed candidate virtual image may be compared with the target mixed virtual image to extract and select the most similar mixed candidate virtual image.

Moreover, in the step S34, the XYZ tristimulus values, which is the color information of the candidate virtual image forming the selected mixed candidate virtual image (i.e., the color information of the selected candidate virtual image), may be extracted, and the color information of the selected candidate virtual image may be used in a step S36, which is described later.

Next, in a step S35, the processor 400 may select the highest candidate transmittance among the obtained candidate transmittances.

Next, in a step S36, the processor 400 may generate R, G, and B image data RGBv forming the selected candidate virtual image that corresponds to the candidate transmittance selected in step S35. For example, the XYZ tristimulus values, which are the color information of the selected candidate virtual image extracted in step S34, may be converted into the R, G, and B image data RGBv.

Next, in a step S37, the processor 400 may output the R, G, and B image data RGBv generated in the step S36. In addition, in the step S37, the processor 400 may generate and output the R, G, and B shutter data RGBs corresponding to the transmittance selected in the step S35.

Accordingly, the optical shutter panel 200 may adjust (or attenuate) the external light according to the selected transmittance, and the image generation module 100 may generate the corrected virtual image which is the selected virtual image, and project it on the display panel 150. The external light adjusted in this way may be mixed with the virtual image output from the display panel 150, so that the mixed virtual image can be provided to the user's eyes.

Accordingly, the user can perceive the mixed virtual image similar to the original virtual image, and the distortion of the virtual image due to the external light can be compensated and improved.

Moreover, in this embodiment, the transmitted external light of the highest brightness may be used, so that there is an advantage in that the light transmission characteristics of the optical see-through display apparatus 10 can be utilized to the fullest extent.

FIGS. 9A and 9B are views illustrating a result of an experiment on implementation of a virtual image through an optical see-through display apparatus according to a second embodiment of the present disclosure.

FIG. 9A diagrammatically shows a result of distortion of an external light on an original virtual image (indicated as "Reference image") in a daily external environment, and a result of applying compensation for the original image according to this embodiment. FIG. 9B diagrammatically shows a result of a distortion of an external light to an original virtual image in an external environment where a very bright external light exists and a result of applying compensation for the original image according to this embodiment. Meanwhile, in FIGS. 9A and 9B, "Error (%)" represents a color difference between the virtual image to which compensation is applied to the original virtual image, and the original virtual image.

Referring to FIGS. 9A and 9B, it can be seen that due to the external light, a significant degree of distortion occurs in both L* which represents brightness and a* and b* which represent chromaticity, and a color of the virtual image is viewed as severely distorted.

However, it can be seen that when the virtual image compensation of this embodiment is applied, the distortion of the virtual image is significantly improved and the virtual image that is substantially close to the original virtual image can be recognized.

Third Embodiment

Figure 10:
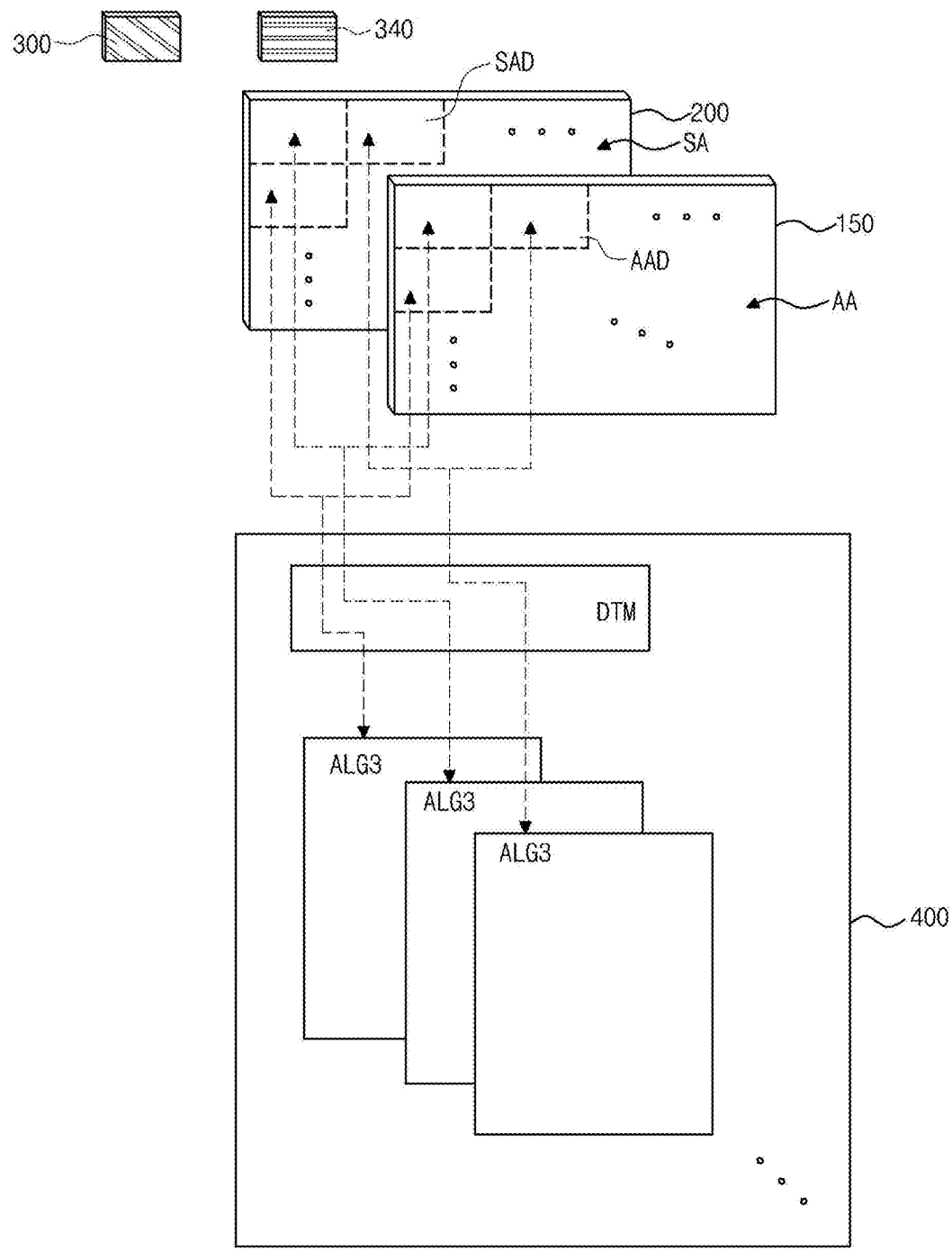
FIG. 10 is a view schematically illustrating an optical see-through display apparatus according to a third embodiment of the present disclosure.

FIG. 10 is a view schematically illustrating an optical see-through display apparatus according to a third embodiment of the present disclosure. In FIG. 10, for convenience of explanation, the display panel 150, the optical shutter panel 200, the processor 400, the optical sensor 300, and the camera 340 are shown, and the remaining components are omitted.

In the following description, detailed descriptions of configurations identical or similar to those of the first and second embodiments as above may be omitted.

In the optical see-through display apparatus 10 of this embodiment, for example, the display region AA of the display panel 150 and the shutter region SA of the optical shutter panel 200 may each be divided to form a plurality of division regions.

For example, the display region AA of the display panel 150 may include a plurality of display division regions (AAD) arranged along the horizontal and vertical directions, and the shutter region SA of the optical shutter panel 200 may include a plurality of shutter division regions SAD respectively positioned to correspond to the plurality of display division regions AAD of the display region AA.

As the display panel 150 and the optical shutter panel 200 are divided into the plurality of division regions AAD and SAD, the processor 400 may perform a virtual image compensation for each division region.

In this embodiment, a case where the processor 400 performs the virtual image compensation using the integrated compensation algorithm ALG3 of the second embodiment is taken as an example. As another example, the processor 400 may be configured to use the compensation algorithm ALG1 of FIG. 6 and/or the compensation algorithm ALG2 of FIG. 7 of the first embodiment.

For detailed description of these compensation algorithms ALG1 to ALG3, refer to the above-described first and second embodiments.

Meanwhile, the processor 400 may perform an operation DTM to determine whether (or whether it is beneficial) to apply the compensation algorithm to each division area AAD and SAD.

To judge whether to apply the compensation algorithm for each division region AAD and SAD, for example, the camera 340 may be used, and in addition, the optical sensor 300 may be used together.

In this regard, the camera 340 may capture an external environment located in front of the optical see-through display apparatus 10 and provide the captured image to the processor 400.

For the captured external environment image, the processor 400 may analyze a color information of a part of an external environment corresponding to each division region AAD and SAD, so that the processor 400 may judge whether a color of a part of the virtual image expressed in the division region AAD and SAD is distorted by the part of the external environment corresponding to each division region AAD and SAD.

As a result of the judgment, if a level of the color distortion is determined to be a critical level or greater, the compensation algorithm may be applied to the corresponding division region AAD and SAD.

Meanwhile, if the color distortion level is determined to be below the critical level, the application of the compensation algorithm may be omitted for the corresponding division region AAD and SAD.

Meanwhile, the camera 340 may have a limitation in accurately measuring the intensity of each color of the external light due to its characteristics, and to compensate for this, a color information of the external light measured by the optical sensor 300 may be used. For example, if an intensity of light in the external environment is too strong for the camera 340 to measure, or if the external environment is monochromatic, the external light color information measured by the optical sensor 300 may be used to judge whether the processor 400 applies the compensation algorithm for each division region AAD and SAD.

As such, the virtual image compensation algorithm can be applied by each division region AAD and SAD, so that the compensation algorithm can be applied to the division region AAD, SAD) that requires the compensation, and the operation of the compensation algorithm can be optimized. Moreover, since the compensation algorithm is not applied to the division region AAD and SAD that does not require the compensation, power consumption can be reduced, enabling a low power operation.

Fourth Embodiment

Figure 11:
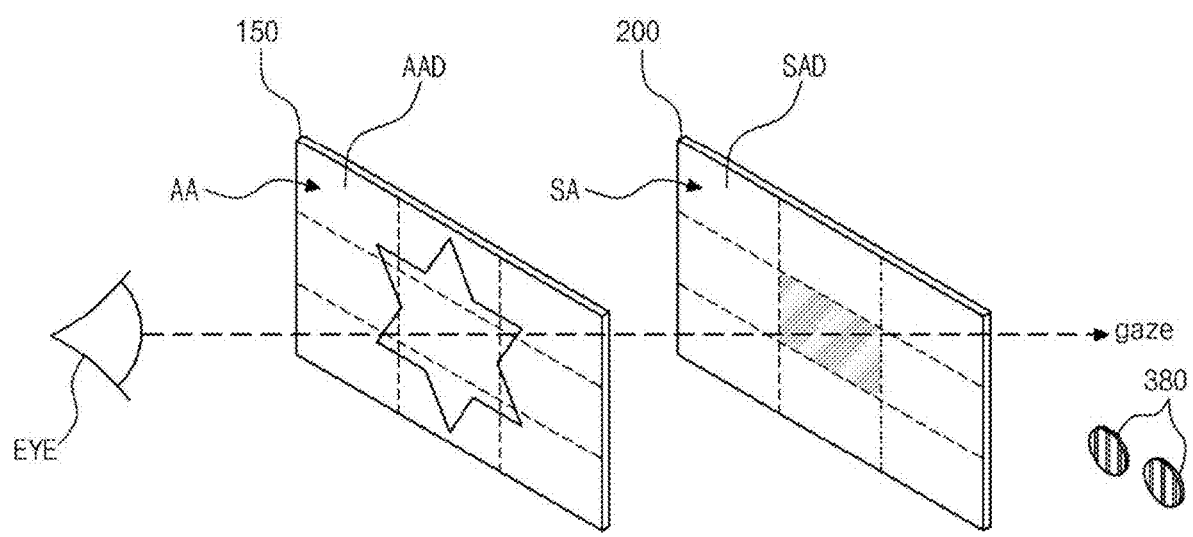
FIG. 11 is a view schematically illustrating an optical see-through display apparatus according to a fourth embodiment of the present disclosure.

FIG. 11 is a view schematically illustrating an optical see-through display apparatus according to a fourth embodiment of the present disclosure. In FIG. 11, for convenience of explanation, the display panel 150, the optical shutter panel 200, and the eye tracker 380 are shown, and the remaining components are omitted.

In the following description, detailed descriptions of configurations identical or similar to those of the first, second, and third embodiments as above may be omitted.

Similar to the third embodiment described above, in the optical see-through display apparatus 10 of this embodiment, for example, the display region AA of the display panel 150 and the shutter region SA of the optical shutter panel 200 may be each divided to form a plurality of division regions AAD and SAD.

As the display panel 150 and the optical shutter panel 200 are divided into the plurality of division regions AAD and SAD, the processor (400 of FIG. 10) may perform the virtual image compensation by each division region AAD and SAD.

In this embodiment, similar to the third embodiment, the processor may perform the compensation for each division region using the compensation algorithm ALG1 of FIG. 6 of the first embodiment and/or the compensation algorithm ALG2 of FIG. 7 of the first embodiment, or the integrated compensation algorithm ALG3 of the second embodiment.

Meanwhile, in this embodiment, by using the eye tracker 380, the compensation algorithm may be applied to the division region AAD and SAD that overlaps (or corresponds to) a gaze of the user's eyes EYE. FIG. 11 shows an example in which one division region AAD and SAD corresponds to the user's gaze and is applied with the compensation algorithm. However, when a plurality of division regions AAD and SAD are located in the user's gaze, the compensation algorithm may be applied to each of these division regions AAD and SAD.

Accordingly, it is sufficient for the compensation algorithm to be applied to the division region AAD and SAD where the user's gaze stays, and there is no need to apply the compensation algorithm to the remaining division regions AAD and SAD, so that the operation of the compensation algorithm can be further optimized, and also, a low power operation is possible.

Moreover, for the division region AAD and SAD where the user's gaze is located, as mentioned in the third embodiment, the processor may perform an operation to determine whether the compensation algorithm is applied (or whether it is beneficial), and if it is determined that the application is beneficial, the compensation algorithm may be run for the corresponding division region.

As described above, according to the embodiments of the present disclosure, the optical shutter panel capable of individually adjusting the transmittance for each color is provided, so that the external light passing through the optical shutter panel can be adjusted (or attenuated) for each color.

In addition, by using the compensation algorithm that can adjust the color of the external light, the processor can adjust the color of the external light by adjusting the transmittance of the optical shutter panel for each color, and accordingly, the color-adjusted external light can be mixed with the virtual image and provided to the user. Furthermore, by using the compensation algorithm that can adjust the color of the virtual image, the processor can correct the color of the virtual image output from the display panel based on the external light, and accordingly, the corrected virtual image can be mixed with the external light and provided to the user. Furthermore, by using the integrated compensation algorithm that can control the color of the external light and the color of the virtual image, the processor can adjust the color of the external light by adjusting the transmittance of the optical shutter panel for each color and can adjust the color of the virtual image output from the display panel based on the adjusted external light, and accordingly, the corrected virtual image can be mixed with the color-adjusted external light and provided to the user.

Therefore, the user can view the mixed virtual image similar to the original virtual image, and the distortion of the virtual image due to the external light can be compensated and improved.

In addition, the display panel and the optical shutter panel can be divided, and the compensation algorithm can be applied to each division region. Accordingly, the compensation algorithm can be applied to the division region requiring the compensation, so that the operation of the compensation algorithm can be optimized and a low power operation is possible.

In addition, by tracking the user's eyes, the compensation algorithm can be applied to the region where the gaze is located. Accordingly, it is sufficient for the compensation algorithm to be applied to the region where the user's gaze is located, so that the operation of the compensation algorithm can be further optimized and a low power operation is possible.

It will be apparent to those skilled in the art that various modifications and variation can be made in the present disclosure without departing from the spirit or scope of the disclosure. Thus, it is intended that the present disclosure cover the modifications and variations of this disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An optical see-through display apparatus, comprising:
   an image output module including an image generation panel that generates a virtual image;
   a display panel on which the virtual image is projected, the virtual image being output toward a user's eyes from a display region of the display panel;
   an optical shutter panel disposed on an outer surface of the display panel, and including red (R), green (G), and blue (B) sub-pixels to adjust a transmittance of an external light for each of R, G, and B colors;
   an optical sensor that measures a color of the external light; and
   a processor that generates R, G, and B shutter data through a first compensation algorithm and provides the R, G, and B shutter data to the optical shutter panel,
   wherein the first compensation algorithm is operated to:
   compare a color of a mixed virtual image, which is a mixture of an original virtual image and the external light transmitted through the optical shutter panel, with a color of a target mixed virtual image, and when a color difference between the mixed virtual image and the target mixed virtual image is equal to or less than a threshold value, designate a transmittance of the optical shutter panel as a candidate transmittance, and
   select a candidate transmittance, which implements the mixed virtual image that is most similar to the color of the target mixed virtual image, among designated candidate transmittances, and generate the R, G, and B shutter data corresponding to the selected candidate transmittance.

2. The display apparatus of claim 1, wherein the first compensation algorithm is operated to:
   receive a color information of the external light measured by the optical sensor and convert the color information into XYZ tristimulus values,
   change the transmittance of the optical shutter panel for each of the R, G, and B colors, and apply the transmittance of the optical shutter panel to the XYZ tristimulus values of the external light to calculate XYZ tristimulus values of the transmitted external light,
   add the XYZ tristimulus values of the transmitted external light and XYZ tristimulus values of the original virtual image to calculate XYZ tristimulus values of the mixed virtual image, and convert the XYZ tristimulus values of the mixed virtual image into L*a*b* coordinate values,
   compare the L*a*b* coordinate values of the mixed virtual image with L*a*b* coordinate values of the target mixed virtual image, and when a difference between the L*a*b* coordinate values of the mixed virtual image and the L*a*b* coordinate values of the target mixed virtual image is equal to or less than the threshold value, designate the transmittance of the optical shutter panel as the candidate transmittance, and
   select the candidate transmittance, which implements the mixed virtual image that is most similar to the color of the target mixed virtual image, among the designated candidate transmittances, and generate the R, G, and B shutter data corresponding to the selected candidate transmittance,
   wherein L* is indicative of brightness, a* is indicative of chromaticity, and b* is indicative of a color.

3. The display apparatus of claim 1, wherein the threshold value is 5 in a L*a*b* color space,
   wherein the first compensation algorithm is operated to generate R, G, and B image data corresponding to the original virtual image, and
   wherein the R, G, and B image data are provided to the image generation panel.

4. The display apparatus of claim 1, wherein the display region of the display panel and a shutter region of the optical shutter panel each include a plurality of division regions, and the plurality of division regions of the display region respectively correspond to the plurality of division regions of the shutter region, and
   wherein the first compensation algorithm is applied for each division region.

5. The display apparatus of claim 4, further comprising a camera that captures an external environment in front of the display panel,
   wherein the processor analyzes a color information of an external environment image captured by the camera to determine a level of color distortion of a part of the virtual image represented in the division region due to a part of the external environment corresponding to the division region, and
   wherein the processor applies the first compensation algorithm to the division region where the level of color distortion is equal to or higher than a critical level, and omits the first compensation algorithm for the division region where the level of color distortion is less than the critical level.

6. The display apparatus of claim 4, further comprising an eye tracker that tracks a user's gaze,
   wherein the processor applies the first compensation algorithm to the division region located in the user's gaze.

7. The display apparatus of claim 1, wherein the image generation panel is a liquid crystal panel or a light emitting diode panel, and
   wherein the optical shutter panel is a liquid crystal panel or an electrophoretic panel.

8. An optical see-through display apparatus, comprising:
   an image output module including an image generation panel that generates a virtual image;
   a display panel on which the virtual image is projected, the virtual image being output toward a user's eyes from a display region of the display panel;
   an optical shutter panel disposed on an outer surface of the display panel, and including R, G, and B sub-pixels to adjust a transmittance of an external light for each of R, G, and B colors;
   an optical sensor that measures a color of the external light; and
   a processor that generates R, G, and B image data through a second compensation algorithm and provides the R, G, and B image data to the image generation panel,
   wherein the second compensation algorithm is operated to:

mix at least one candidate virtual image and the external light to generate at least one mixed candidate virtual image, and compare a color of the at least one mixed candidate virtual image with a color of a target mixed virtual image to select the mixed candidate virtual image that is most similar to the target mixed virtual image, and generate the R, G, B image data corresponding to the candidate virtual image forming the selected mixed candidate virtual image.

9. The display apparatus of claim 8, wherein the second compensation algorithm is operated to:

receive a color information of the external light measured by the optical sensor and convert the color information into XYZ tristimulus values, and apply a transmittance of the optical shutter panel to the XYZ tristimulus values of the external light to calculate XYZ tristimulus values of the external light transmitted the optical shutter panel, determine whether a correction of the virtual image is possible based on the XYZ tristimulus values of the transmitted external light, when the correction of the virtual image is determined to be possible, generate the at least one candidate virtual image by correcting an original virtual image, and add XYZ tristimulus values of the at least one candidate virtual image and the XYZ tristimulus values of the transmitted external light to calculate XYZ tristimulus values of the at least one mixed candidate virtual image, and convert the XYZ tristimulus values of the at least one mixed candidate virtual image into L*a*b* coordinate values, compare the L*a*b* coordinate values of the at least one mixed candidate virtual image with L*a*b* coordinate values of the target mixed virtual image to select the mixed candidate virtual image that is most similar to the target mixed virtual image, and generate the R, G, B image data corresponding to the candidate virtual image forming the selected mixed candidate virtual image, wherein L* is indicative of brightness, a* is indicative of chromaticity, and b* is indicative of a color.

10. The display apparatus of claim 8, wherein the second compensation algorithm is operated to generate R, G, and B shutter data that implements the external light forming the selected mixed candidate virtual image, and wherein the R, G, and B shutter data are provided to the optical shutter panel.

11. The display apparatus of claim 8, wherein the display region of the display panel and a shutter region of the optical shutter panel each include a plurality of division regions, and the plurality of division regions of the display region respectively correspond to the plurality of division regions of the shutter region, and wherein the second compensation algorithm is applied for each division region.

12. The display apparatus of claim 11, further comprising a camera that captures an external environment in front of the display panel, wherein the processor analyzes a color information of an external environment image captured by the camera to determine a level of color distortion of a part of the virtual image represented in the division region due to a part of the external environment corresponding to the division region, and wherein the processor applies the second compensation algorithm to the division region where the level of color distortion is equal to or higher than a critical level, and omits the second compensation algorithm for the division region where the level of color distortion is less than the critical level.

13. The display apparatus of claim 11, further comprising an eye tracker that tracks a user's gaze, wherein the processor applies the second compensation algorithm to the division region located in the user's gaze.

14. The display apparatus of claim 8, wherein the image generation panel is a liquid crystal panel or a light emitting diode panel, and wherein the optical shutter panel is a liquid crystal panel or an electrophoretic panel.

15. An optical see-through display apparatus, comprising:

an image output module including an image generation panel that generates a virtual image;

a display panel on which the virtual image is projected, the virtual image being output toward a user's eyes from a display region of the display panel;

an optical shutter panel disposed on an outer surface of the display panel, and including R, G, and B sub-pixels to adjust a transmittance of an external light for each of R, G, and B colors;

an optical sensor that measures a color of the external light; and a processor that generates R, G, and B shutter data and R, G, and B image data through a third compensation algorithm, provides the R, G, and B shutter data to the optical shutter panel, and provides the R, G, and B image data to the image generation panel, wherein the third compensation algorithm is operated to:

when it is determined that a correction of the virtual image is possible, designate a transmittance of the optical shutter panel, which implements a candidate transmitted external light transmitted through the optical shutter panel, as a candidate transmittance, mix the candidate transmitted external light and at least one candidate virtual image corresponding thereto to generate at least one mixed candidate virtual image, compare a color of the at least one mixed candidate virtual image with a color of a target mixed virtual image to select the mixed candidate virtual image that is most similar to the target mixed virtual image, select a candidate transmittance that is highest among designated candidate transmittances, generate the R, G, B image data corresponding to the candidate virtual image of the selected mixed candidate virtual image implemented by the selected candidate transmittance, and generate the R, G, B shutter data corresponding to the selected candidate transmittance.

16. The display apparatus of claim 15, wherein the third compensation algorithm is operated to:

receive a color information of the external light measured by the optical sensor and convert the color information into XYZ tristimulus values, change the transmittance of the optical shutter panel for each of the R, G, and B colors, and apply the transmittance of the optical shutter panel to the XYZ tristimulus values of the external light to calculate XYZ tristimulus values of the transmitted external light, add the XYZ tristimulus values of the transmitted external light and XYZ tristimulus values of an original virtual image to calculate XYZ tristimulus values of a mixed virtual image, and convert the XYZ tristimulus values of the mixed virtual image into L*a*b* coordinate values,
determine whether a correction of the virtual image is possible based on the L*a*b* coordinate values of the mixed virtual image,
when the correction of the virtual image is determined to be possible, designate the transmittance of the optical shutter panel, which implements the candidate transmitted external light forming the mixed virtual image, as the candidate transmittance,
add XYZ tristimulus values of the candidate transmitted external light and XYZ tristimulus values of the at least one candidate virtual image corresponding to the candidate transmitted external light to calculate XYZ tristimulus values of the at least one mixed candidate virtual image, and convert the XYZ tristimulus values of the at least one mixed candidate virtual image into L*a*b* coordinate values,
compare the L*a*b* coordinate values of the at least one mixed candidate virtual image with L*a*b* coordinate values of the target mixed virtual image to select the mixed candidate virtual image that is most similar to the target mixed virtual image,
select the candidate transmittance that is highest among the designated candidate transmittances,
generate the R, G, B image data corresponding to the candidate virtual image of the selected mixed candidate virtual image implemented by the selected candidate transmittance, and
generate the R, G, B shutter data corresponding to the selected candidate transmittance,
wherein L* is indicative of brightness, a* is indicative of chromaticity, and b* is indicative of a color.

17. The display apparatus of claim 16, wherein in determining whether the correction of the virtual image is possible, the third compensation algorithm compares the L*a*b* coordinate values of the mixed virtual image with the L*a*b* coordinate values of the target mixed virtual image, and determines that the correction is possible when a difference between the L*a*b* coordinate values of the mixed virtual image and the L*a*b* coordinate values of the target mixed virtual image is equal to or less than a threshold value, and
wherein the threshold value is 5 in a L*a*b* color space.

18. The display apparatus of claim 15, further comprising a camera that captures an external environment in front of the display panel,
wherein the display region of the display panel and a shutter region of the optical shutter panel each include a plurality of division regions, and the plurality of division regions of the display region respectively correspond to the plurality of division regions of the shutter region,
wherein the third compensation algorithm is applied for each division region,
wherein the processor analyzes a color information of an external environment image captured by the camera to determine a level of color distortion of a part of the virtual image represented in the division region due to a part of the external environment corresponding to the division region, and
wherein the processor applies the third compensation algorithm to the division region where the level of color distortion is equal to or higher than a critical level, and omits the third compensation algorithm for the division region where the level of color distortion is less than the critical level.

19. The display apparatus of claim 18, further comprising an eye tracker that tracks a user's gaze,
wherein the processor applies the third compensation algorithm to the division region located in the user's gaze.

20. The display apparatus of claim 15, wherein the image generation panel is a liquid crystal panel or a light emitting diode panel, and
wherein the optical shutter panel is a liquid crystal panel or an electrophoretic panel.

* * * * *